US009772742B2

(12) United States Patent
Guest et al.

(10) Patent No.: US 9,772,742 B2
(45) Date of Patent: Sep. 26, 2017

(54) SYSTEM AND METHOD FOR REMOTE CONTROLLING COMPUTING DEVICE

(71) Applicant: RealVNC Ltd, Cambridge, Cambridgeshire (GB)

(72) Inventors: Steven Guest, Cambridge (GB); Tristan J. Richardson, Cambridge (GB); Jason Barrie Morley, Cambridge (GB)

(73) Assignee: RealVNC Ltd, Cambridge (GB)

( * ) Notice: Subject to any disclaimer, the term of this patent is extended or adjusted under 35 U.S.C. 154(b) by 395 days.

(21) Appl. No.: 14/421,111

(22) PCT Filed: Feb. 28, 2013

(86) PCT No.: PCT/GB2013/050488
§ 371 (c)(1),
(2) Date: Feb. 11, 2015

(87) PCT Pub. No.: WO2014/027173
PCT Pub. Date: Feb. 20, 2014

(65) Prior Publication Data
US 2015/0220242 A1    Aug. 6, 2015

(30) Foreign Application Priority Data

Aug. 16, 2012 (GB) .................. 1214635.3

(51) Int. Cl.
*G06F 3/00* (2006.01)
*G06F 3/0481* (2013.01)
(Continued)

(52) U.S. Cl.
CPC ........ *G06F 3/04812* (2013.01); *G06F 3/0354* (2013.01); *G06F 9/4445* (2013.01); *H04L 41/22* (2013.01)

(58) Field of Classification Search
CPC combination set(s) only.
See application file for complete search history.

(56) References Cited

U.S. PATENT DOCUMENTS

| | | |
|---|---|---|
| 5,642,131 A | 6/1997 | Pekelney et al. |
| 5,786,805 A | 7/1998 | Barry |

(Continued)

FOREIGN PATENT DOCUMENTS

| | | |
|---|---|---|
| EP | 0982678 | 3/2000 |
| JP | H06103013 | 4/1994 |

(Continued)

OTHER PUBLICATIONS

Japanese Patent Application No. 2015-527019, Office Action dated Dec. 20, 2016.

(Continued)

*Primary Examiner* — Hien Duong
(74) *Attorney, Agent, or Firm* — Sheppard, Mullin, Richter & Hampton LLP (57) ABSTRACT

A first computing device for controlling a second computing device, the first computing device comprising a processor; a display; a user input in the form of a pointer; and a data link for connecting said first and second computing devices. The display displays image data from said second computing device within a window that is smaller than said display. The processor is configured to determine that said pointer has left said window; responsive to determining said pointer has left said window, determine an intersection point on an edge of said window, said intersection point being a location at which the pointer left said window; determine whether said intersection point is within a threshold distance from a nearest corner of said window; and responsive to determining said intersection point is within said threshold distance, (Continued)

output a message to said second computing device that said pointer is positioned on said nearest corner.

18 Claims, 5 Drawing Sheets

(51) Int. Cl.
*G06F 9/44* (2006.01)
*G06F 3/0354* (2013.01)
*H04L 12/24* (2006.01)

(56) References Cited

U.S. PATENT DOCUMENTS

| | | | |
|---|---|---|---|
| 5,898,419 A * | 4/1999 | Liu | G06F 3/0481 345/660 |
| 2002/0089488 A1 | 7/2002 | McBrearty et al. | |
| 2004/0001044 A1* | 1/2004 | Luciani, Jr. | G06F 3/04812 345/157 |
| 2005/0060658 A1 | 3/2005 | Tsukiori | |
| 2007/0106939 A1* | 5/2007 | Qassoudi | G06F 3/0481 715/704 |
| 2009/0058804 A1 | 3/2009 | Nagao | |
| 2009/0282359 A1 | 11/2009 | Saul et al. | |
| 2010/0269039 A1 | 10/2010 | Pahlavan et al. | |
| 2011/0148761 A1* | 6/2011 | Jeong | G06F 3/038 345/157 |
| 2012/0011280 A1* | 1/2012 | Gilboa | G06F 9/4443 709/246 |
| 2012/0011445 A1* | 1/2012 | Gilboa | G06F 3/0481 715/740 |
| 2012/0066624 A1* | 3/2012 | Kwak | G06F 3/04812 715/765 |
| 2013/0179781 A1* | 7/2013 | Nan | G06F 3/0482 715/711 |
| 2013/0212522 A1* | 8/2013 | Fleizach | G06F 3/0488 715/784 |
| 2014/0002361 A1* | 1/2014 | Ballard | G06F 3/03543 345/163 |

FOREIGN PATENT DOCUMENTS

| | | |
|---|---|---|
| JP | 2000099260 | 4/2000 |
| JP | 2005092447 | 4/2005 |
| JP | 2009054114 | 3/2009 |
| JP | 2010000195 | 1/2010 |
| JP | 2011520209 | 7/2011 |

OTHER PUBLICATIONS

International Application No. PCT/GB2013/050488, International Search Report and Written Opinion dated May 22, 2013.
United Kingdom Patent Application No. GB1214635.3, Search Report dated Dec. 17, 2012.

\* cited by examiner

SYSTEM AND METHOD FOR REMOTE CONTROLLING COMPUTING DEVICE

CROSS-REFERENCE TO RELATED APPLICATIONS

This application is a national stage application pursuant to 35 U.S.C. §371 of International Application No. PCT/GB2013/050488, filed Feb. 28, 2013, which claims priority to United Kingdom Patent Application No. 1214635.3, filed Aug. 16, 2012, the disclosures of which are hereby incorporated by reference herein.

FIELD OF THE INVENTION

The present invention relates to a method and system for remote controlling and/or viewing a computing device.

BACKGROUND

It is known to use a first computer device to view and control a second computer device using a Virtual Network Computing (VNC) viewer application running on the first computer device (VNC viewer) and a VNC server application running on the second computer device (VNC server). The contents of the display of the second computer device are duplicated on the first computer device which is typically remote from the second computer device. The first computer device has an interface mechanism which allows the user to send user input events, such as pressing a physical key on the device, moving the mouse cursor or touching a touch screen input, to the second computer device being controlled. As will be appreciated, the form of data link and the nature of the computer devices can vary, depending on the situation being used.

The first computer device may be for a support engineer using the remote control facility to provide device support to a customer using a second computer device. If a customer of a company experiences a problem with their computer device, the support engineer can diagnose and fix the problem by viewing or interacting with the customer's device by using the first device. Alternatively, the support engineer may use the first device to install or update software or other settings on a user's device. Alternatively, the first computer device may be for a user using the remote control facility to control another computer device.

It is known for an operating system running on a computer device to rely on a user moving the mouse to certain corners (or edges) of the screen. For example, Microsoft® have introduced a Modern UI "Start Screen" in Windows 8's desktop behaviour. The Modern UI "Start Screen" is invoked by clicking in the bottom-left corner of the screen, and the other corners and edges are used for other user interface purposes. Recent versions of Mac OS X also allow the user to define custom actions which are performed when the cursor is placed in one of the corners of the screen. There are both operating systems (OS) and third-party applications that provide collapsible docks/taskbars when moving the cursor to the edge of the screen.

Figure 1:
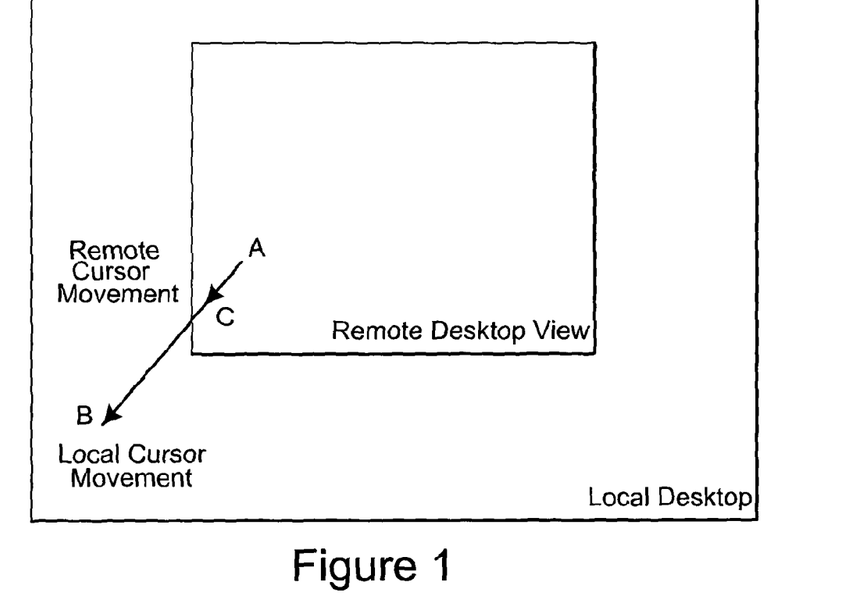
FIG. 1 is a schematic illustration of a screenshot from a display on a first computer device (local desktop) with a window showing a display of a second computer device (remote desktop)

FIG. 1 shows a screenshot of the display from the first computer device (local desktop running VNC viewer). A view of the display from the second computer device (remote desktop running VNC server) is shown as a window within the full display for the first computer device. Such a window may be termed a VNC Viewer window. Thus the VNC viewer is being used in "windowed" mode which is desirable because it allows the user to work with other local desktop windows without handling the VNC Viewer window any differently.

FIG. 1 illustrates a problem with the remote control facility which occurs in such situations. The remote cursor (i.e. cursor on the remote desktop) starts aligned with the local cursor (i.e. cursor on the local desktop) at A. The user wishes to invoke the bottom-left-hand corner user interface in the remote display and thus moves the local cursor to B in a quick motion, aiming approximately for the corner of the remote desktop view. If the user was working physically at the remote desktop, moving the mouse to the bottom-left in such a quick, coarse way would not require subsequent corrective movements and would trigger the desired user interface. In general, individual quick mouse movements are not very precise and users do not generally wish to spend time moving the mouse slowly to achieve accuracy. A user is unlikely to have pinpoint accuracy when aiming the mouse cursor for the corner of the window for the remote desktop.

However, as shown in FIG. 1, such a coarse movement results in the remote cursor stopping at point C which is not close enough to the corner to trigger the desired user interface. This occurs because the local and remote cursors are only updated at a limited rate. For example, a typical USB mouse running under Microsoft® Windows 7 is updated at 125 Hz. Thus for a 1680 pixel width display, a rapid movement across the display could be achieved in around 200 ms. This means that the remote desktop receives cursor updates about 70 pixels apart. Accordingly, the mouse cursor on the local desktop does not "stick" to the desired corner/edge of the remote desktop display when a user is attempting to control the remote machine. Instead, the user has to place the mouse cursor very precisely on the corner/edge of the remote desktop view. This may be slow and tedious, particularly if the detection area of the user interface mechanism is very small.

It is noted that a similar problem can occur in full screen mode depending on the screen resolutions for both the local and remote desktops and the VNC Viewer display scaling setting. Typically, the VNC Viewer Screen will not cover the whole display of the local desktop and can be considered to be "letterboxed" on the local display. In such situations, a user will experience the frustrations illustrated in FIG. 1 when attempting to hit the corner of the remote desktop display. Only when VNC Viewer Screen is completely covering the whole display of the local desktop will the issue of "hitting the corners" go away and the user experience on the local desktop will be very similar to working physically at the remote desktop.

The applicant has recognised the need for improved remote control.

SUMMARY OF THE INVENTION

According to a first aspect of the invention, there is provided a first computing device for controlling a remote computing device, the first computing device comprising
   a processor;
   a display for displaying data to a user;
   a user input in the form of a pointer which is moveable across said display for a user to input controls and
   a data link for connecting said first computing device to said remote computing device with image data from said remote computing device being received at said first computing device over said data link and user controls being transmitted from said first computing device to said remote computing device whereby said first computing device controls said remote computing device;

wherein said display displays image data from said remote computing device within a window on said display, said window being smaller than said display;

wherein said processor is configured to determine that said pointer has left said window;

responsive to determining said pointer has left said window, determine an intersection point on an edge of said window, said intersection point being the location at which the pointer left said window;

determine whether or not said intersection point is within a threshold distance from a nearest corner of said window and responsive to determining said intersection point is within said threshold distance, output a message to said remote computing device that said pointer is positioned on said nearest corner.

According to a second aspect of the invention, there is provided a method of using a first computing device to control a remote computing device, the method comprising displaying image data from said remote computing device within a window on a display of said first computing device, said window being smaller than said display;

determining that a pointer which is moveable across said display has left said window;

responsive to determining said pointer has left said window, determining an intersection point on an edge of said window, said intersection point being the location at which the pointer left said window;

determining whether or not said intersection point is within a threshold distance from a nearest corner of said window and responsive to determining said intersection point is within said threshold distance, outputting a message to said remote computing device that said pointer is positioned on said nearest corner.

The following features apply to both the method and system.

The first and second (local and remote) devices may be any computing terminal, for example desktops, PCs, servers as well as portable devices such as mobile phones, PDAs, laptops, tablets and similar devices. By remote, it is typically meant that the two devices are physically remote from each other. The devices may be located a considerable distance away from each other or may be located close by (e.g. both within a vehicle). However, it is also possible for one or both of the devices to be a virtual machine in which case the devices to be running are on the same physical machine. The second device (remote device) may be termed a VNC server since it is sending information to be viewed on the first device (local device). The first device may be termed a VNC viewer. These terms are used interchangeably throughout the description.

A pointer is any user input which is moveable across the display, typically this is a cursor under the control of a mouse but it is not so limited. For example, the display may be touch sensitive and the pointer may be a user touch on the screen.

In the present invention, the location of the pointer is only forced to a particular location when it moves outside the window. Accordingly, there is no need to capture the pointer when the user first clicks into the window and aggressively monitor the pointer movement so that it is restricted to the window. Thus, the pointer is allowed to behave in its normal fashion across the entire display of the first computing device. This mitigates the risk of causing problems for users having different software. There is also no need to have another icon or mechanism (e.g. key combination, holding against the edge of window for a few seconds, double bouncing against edge of the window) for a user to release the pointer. Thus, the user experience is not slowed down. The present invention also does not require any modification of the view of the remote computing device within the window, i.e. there is no need for a border or buffer zone to allow for less accuracy in hitting the edges/corners of the window.

As explained in the background section above, using a computing device in "windowed" mode is desirable because it allows the user to work with other local desktop windows without handling the window viewing the remote computing device any differently. In such an embodiment, the term "window" is a well known term of art. The background section also identifies that the display of the remote computing device may not cover the whole display of the first computing device even when working in full screen mode. In such an embodiment, the display of the remote computing device is also considered to be within a window on the display of the first computing device. Thus a window in the context of the invention is simply an area on the display which is smaller than the full area of the display and has at least one boundary (edge) which is spaced away from a closest edge of the display. Such an area is typically rectangular although it will be appreciated that other shapes could be used if supported by the first computing device.

Said first computing device may comprise an operating system which tracks the location of the pointer on the display. The operating system may provide regular updates to the processor regarding the location of the pointer on the display. Alternatively, the operating system may provide updates as and when the pointer is moved by a user. The operating system may be able to determine when a pointer leaves the window and may thus generate a message each time the pointer leaves the window. Furthermore, the operating system may also provide the location of the intersection point. Thus in these embodiments, said processor may be configured to determine that said pointer has left said window by receiving a message from said operating system that said pointer has left said window. Similarly, said processor may be configured to determine said intersection point by receiving the location at which the pointer left said window from said operating system.

There may be embodiments in which there is no operating system or where it is not possible for an operating system to determine when the pointer leaves the window (e.g. when operating in full screen mode). In such embodiments, said processor may be configured to synthesise a message from an operating system that the pointer has left the window. For example, the processor may be configured to receive the location of said pointer on said display and determine whether or not said location is within said window. When it is determined that said received location is outside said window, the processor may be configured to determine whether said pointer was previously within said display, and responsive to determining that said pointer was previously within said display, determine that said pointer has left said window.

Determining whether said pointer was previously within said display may be achieved by storing a Boolean value. For example, if it is determined said received location is within said window, the Boolean value may be set to true, to indicate that said location is within said window. The processor may then be configured to wait for receipt of the next location of said pointer. In other words, the processor loops back to the start. When it is determined that said received location is outside said window, the processor may be configured to determine whether said pointer was previously within said display by determining whether said Boolean value is set. If the Boolean value is set, the previous location was within the window and thus the pointer has just left the window and thus the processor effectively generates a "left window" message. However, if the Boolean value is not set, the previous location was also outside the window and thus the pointer left the window at an earlier event. In these circumstances, the processor may then be configured to loop back to the start and wait for receipt of the next location of said pointer.

When the processor has determined that the pointer has just left the window, the processor may then determine the intersection point. This may be done by determining which boundary of the window is the closest to the received location and setting one co-ordinate of the location to be the co-ordinate of the closest boundary. Alternatively, this may be done by interpolating between the received location which is outside the window and the previous location within the boundary. In this method, the intersection point is the point at which the interpolation line crosses a boundary.

Said threshold distance may be expressed as a percentage of a dimension (e.g. 4% of width/length of said display or the window within said display) or as a distance value (e.g. ¼ inch). Alternatively, said threshold distance may be expressed in pixels, e.g. 30 or 24 pixels. Said threshold value may be set by examining the pixels/dots per inch (DPI) reported by the display that was displaying the window. The DPI may be used to calculate the number of pixels to use as the threshold value. For example, ¼ inch may be an appropriately sized target and for a typical display at 96 DPI, this gives a threshold value of 24 pixels. This method has the advantage that it provides an easy to hit target on displays that have very high DPI, e.g. the 220 DPI 'Retina' display found on the latest MacBooks. A fixed number of pixels for such a device would give a much smaller physical target to hit on such a display. Said threshold value may be user-configurable, for example, said processor may be configured to receive user input to define said threshold distance.

If it determined said intersection point is outside said threshold distance, the processor may be configured to output a message to said remote computing device that said pointer is positioned at said intersection point. In this way, the pointer on the remote computing device will be placed at the edge of the display remote computing device when the local pointer is moved outside the window. This may invoke an edge-based user interface element.

According to another aspect of the invention, there is provided a system comprising a first computing device as described above and a remote computing device coupled to said first computing device, wherein said remote computing device is configured to launch a user interface when remote computing device receives said message that said pointer is positioned on said nearest corner.

The invention further provides processor control code to implement the above-described systems and methods, for example on a general purpose computer system or on a digital signal processor (DSP). The code may be provided on a carrier such as a disk, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings, in which:

FIG. 3b is a schematic illustration of the screenshot of FIG. 1 with cursor movement corrected as described in FIG. 3a;

DETAILED DESCRIPTION OF THE DRAWINGS

Figure 2:
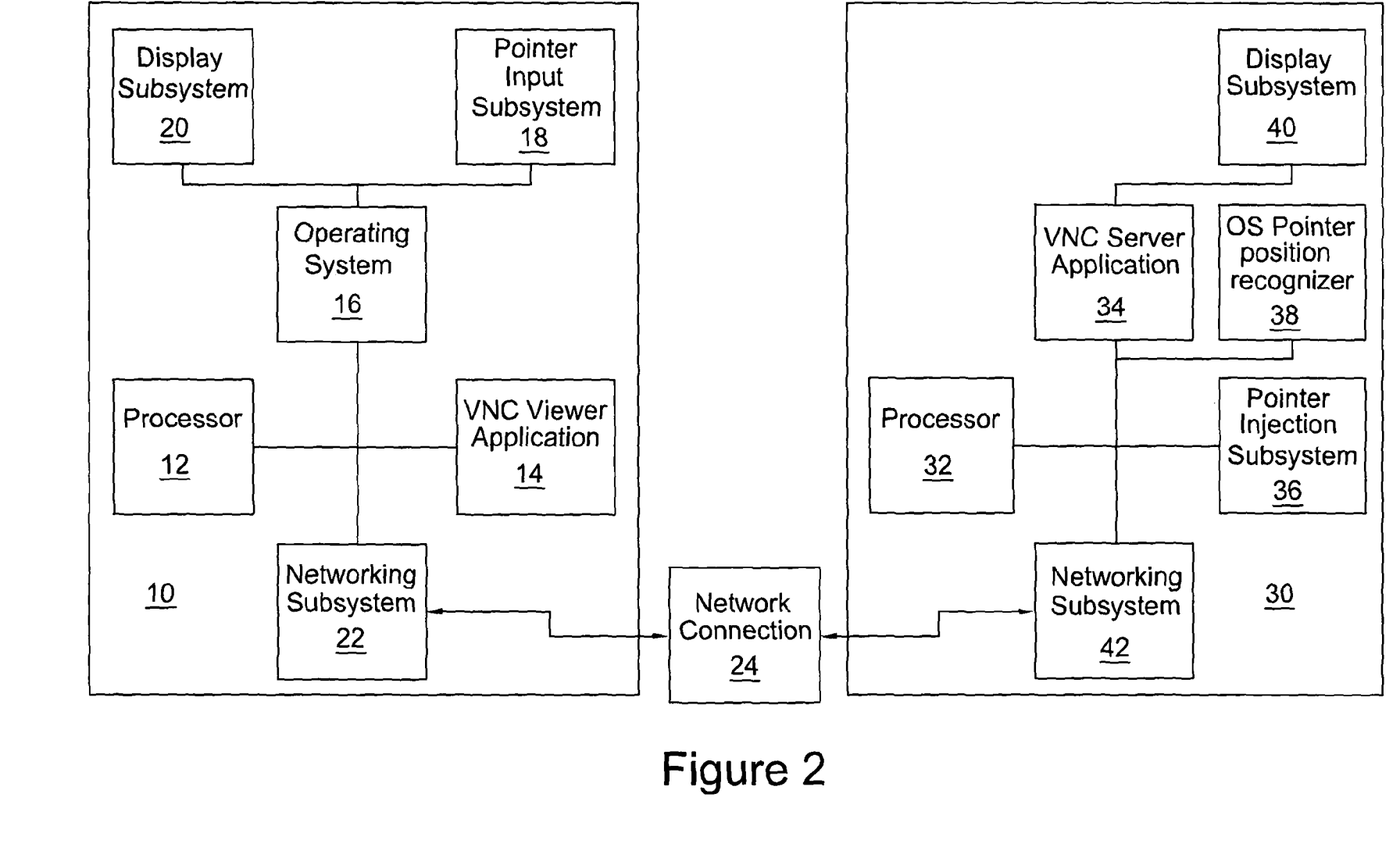
FIG. 2 is a schematic block diagram of the components of the system.

FIG. 2 shows the components of a remote control system comprising a first computer device (local device) 10 connected via a network connection 24 to a second computer device (remote device) 30. The local desktop 10 comprises a processor 12, an operating system 16, a pointer input subsystem 18, a display subsystem 20 and a networking subsystem 22 connected to the network connection. The remote device 30 comprises a processor 32, a pointer input subsystem 36, a pointer position recogniser 38, a display subsystem 40 and a networking subsystem 42 connected to the network connection. A VNC server application 34 is running on the remote device to capture an image of the display subsystem 40 and send it via the network connection networking subsystem (also termed a data link) 42 to the local device; thus the remote device may be termed a VNC server. A corresponding VNC viewer application 14 is running on the local device processor 12 to receive the image of the display via the networking subsystem 22 and output it on the local display subsystem 20; thus the local device may be termed a VNC viewer.

The local device comprises a pointer input subsystem 18 to input cursor (pointer) movements from a user. As explained below in more detail, cursor movements on the local device can trigger cursor movements on the display of the remote device. The pointer injection subsystem 36 and the operating system pointer position recogniser subsystem 38 together with the VNC server application of the remote device translate such cursor movements into events on the remote device.

Figure 3A:
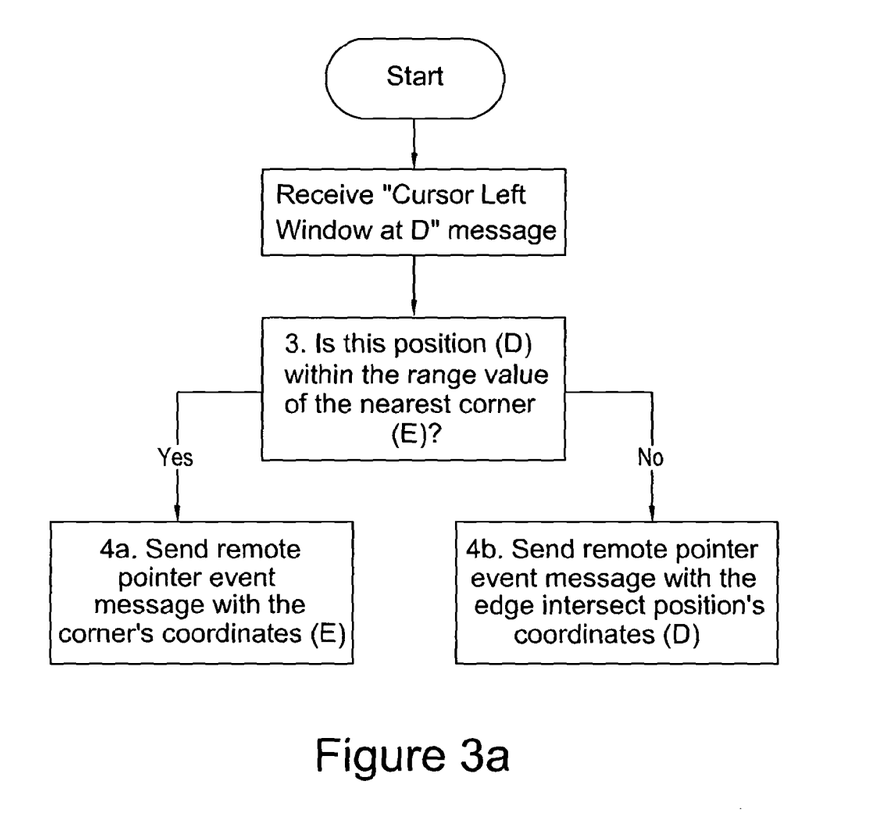
FIG. 3a is a flowchart illustrating a method for controlling the system of FIG. 2.
Figure 3B:
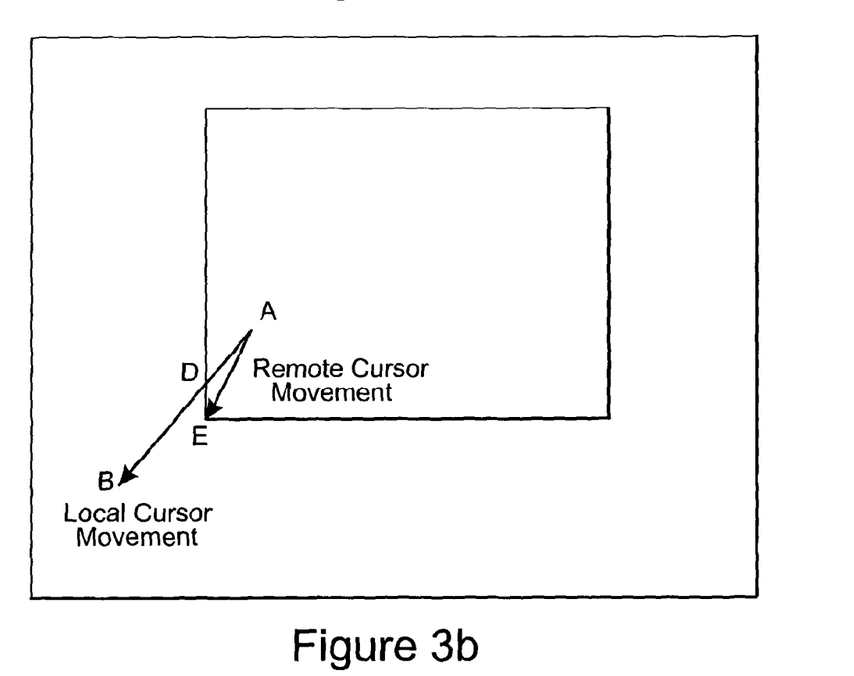

FIGS. 3a and 3b illustrates the proposed solution to the problem shown in FIG. 1 which runs on the system shown in FIG. 2. As shown in FIG. 3b, the local cursor moves from A to B which represents the start step of FIG. 3a. The next step in FIG. 3a is to receive a "cursor left window at D" message. When the local device 10 is running the VNC Viewer application 14 in "Windowed" mode, i.e. the display from the remote device 30 is shown within a VNC viewer window on the display of the local device 10, the operating system 16 provides notifications to the processor 12 of the local device when the cursor leaves the VNC Viewer window. These notifications also provide the (local) coordinates of the point where the cursor left the window, i.e. position D shown in FIG. 3b. These notifications thus provide the point of intersection of the line between positions A and B and the edge of the VNC viewer window.

As explained in the background section, the VNC Viewer application may also be run in "Full Screen" mode on the local device. In some cases, the VNC Viewer Window covers the whole display of the local device. However, in some cases, the VNC Viewer Window will not cover the whole display, for example, if the view of the remote device display is scaled down, or if the view of the remote device display is "letterboxed" due to differences between the local and remote device resolutions, so there is a black "border zone" around the view of the remote device display. When operating in full screen mode, the operating system for the local device considers the VNC Viewer Window to be the whole of the display of the local device. Accordingly, the operating system does not generate the "cursor left window" messages when a user moves the local cursor outside the VNC Viewer Window. In this case, we need to synthesize a "cursor left window" message as explained with reference to FIG. 5.

Returning to FIG. 3a, the next step when a "cursor left window" has been received at the local device processor 12 is to check whether the intersection point (D) is within a certain range of a corner. The corner point is shown as position E in FIG. 3b. Thus, the local device processor 12 may check whether the length of the line DE is less than or greater than a threshold value. If the intersection point is within the range, the location of the remote cursor is "snapped" to the actual corner point via a VNC pointer event message. Alternatively, if the intersection point is outside the range, a VNC pointer event message positioning the location of the remote cursor at the intersection point (D) is sent from the local device processor 12 via the local device networking subsystem 22 and network connection 24. These messages are received by the remote device 30 and the operating system pointer recogniser subsystem 38 of the remote device processes these locations to move the location of the remote cursor. The location of the remote cursor is received by the pointer injection system 36 which triggers an event if appropriate, e.g. if the location is snapped to the corner, a corner user interface is triggered.

The range for the checking step may be specified in local machine pixels and may be set at a default threshold value, e.g. 30 pixels. The threshold value may also be a percentage of the local screen height/width. The threshold value may also have different settings for different server connections. The threshold value may be user-configurable, it can be adjusted via the VNC Viewer options dialog to suit the user's preferences. Additionally, this entire new behaviour can be disabled by setting the "range" value to 0, for users who desire to keep the existing behaviour for whatever reason.

The proposed solution thus guarantees that the remote cursor will always be placed at the edge of the remote desktop view when the local cursor is moved outside it, thereby making it much easier to invoke edge-based user interface elements. Additionally, the user is then given a certain amount of (adjustable) tolerance when aiming for a corner to trigger corner-based user interface elements.

In general, pop-up user interface elements have a certain degree of hysteresis with regard to the cursor location when invoked. In other words, once the corner/edge has been hit and the user interface fades/slides in, a larger movement away from the corner/edge towards the centre of the desktop is required to make the user interface element fade/slide away again. For example, the Windows® 8 Release Preview "Start Tile" user interface element pops up when the cursor is within about 5 pixels of the bottom-left corner, but once it appears, the user can move up to about 25 pixels away before the UI element is hidden again.

Figure 4:
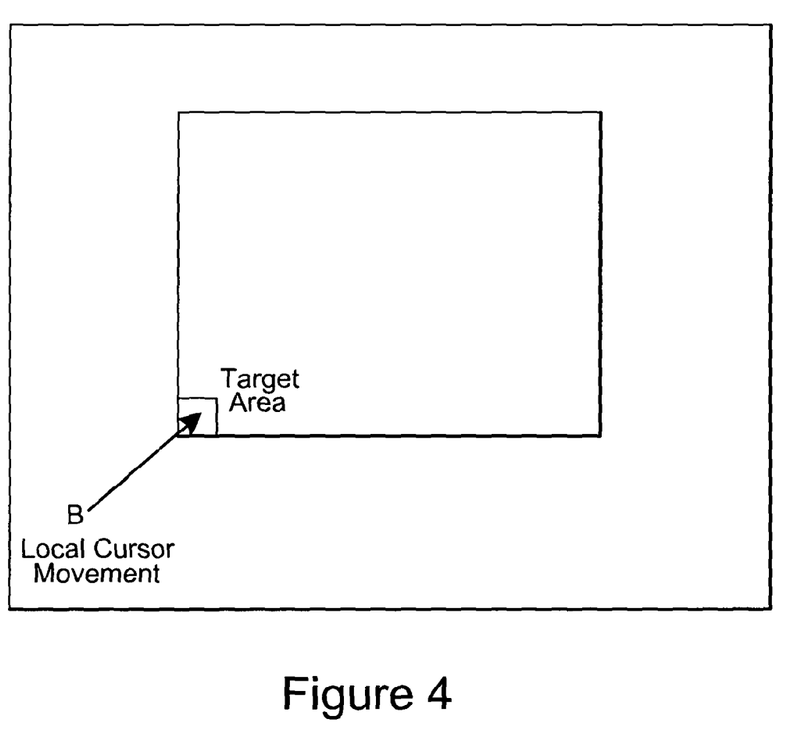
FIG. 4 is a schematic illustration of a screenshot from a display on a first computer device with a window showing a display of a second computer device, the window having a target area.

As explained above, the mouse cursor finished at location B on the display of the local device. In the example shown in FIG. 4, a corner user interface element has been triggered by the movement to location B. Once the user interface element has been triggered, a user would normally click on the relevant section of the user interface element to trigger an event, e.g. opening a new application. Accordingly, the user needs to move the mouse cursor back from location B which is outside the VNC Viewer window onto the pop-up user interface element. As shown in FIG. 4, the user interface element represents quite a large "target area" to aim for when moving, which makes clicking the relevant user interface element much easier. The target area may be three, four or five times larger than an area represented by the threshold value/range of FIG. 3a.

Figure 5:
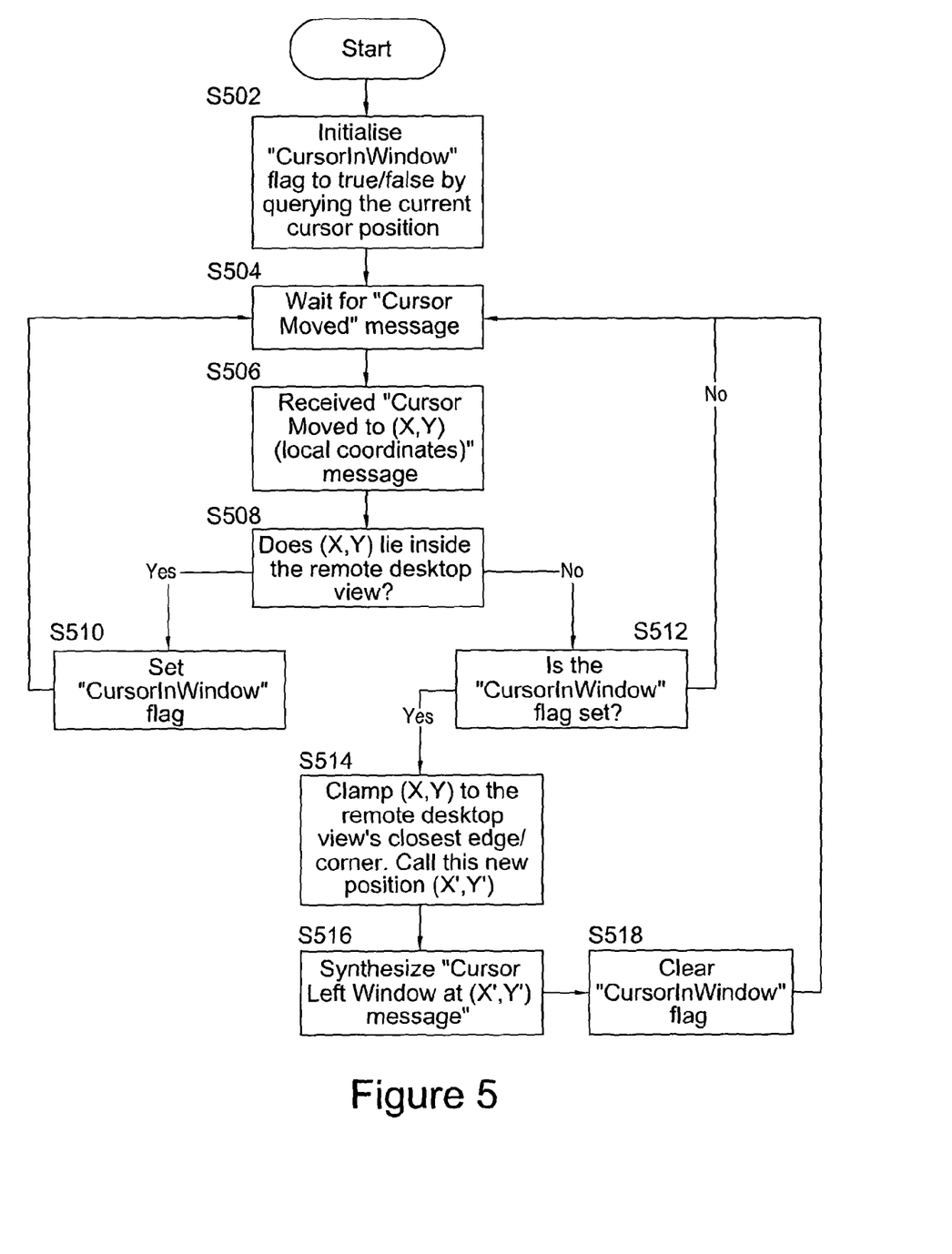
FIG. 5 is a flowchart illustrating a method for synthesising a "cursor left window" to trigger the method of FIG. 3b.

As discussed earlier, when running VNC Viewer in "Full Screen" mode, the VNC Viewer Window is actually the entire screen as far as the operating system of the local device is concerned. Accordingly, "cursor left window" messages are not triggered in the case where a user moves the local cursor outside the VNC Viewer Window. There are occasions in which the VNC Viewer Window does not cover the entire display of the local device, despite the term "Full Screen". For example, this is possible if the remote device resolution is lower than the local device resolution, the devices have displays having different aspect ratios, or the user has made the VNC Viewer Window smaller by applying a scaling option in the VNC viewer. In each case, there will be an area of pixels outside the remote desktop view; VNC Viewer colours these black. FIG. 5 shows an algorithm which may be used to reproduce the "cursor left window" messages in this case by receiving "cursor moved" messages instead.

The first step S502 is to initialise a flag "CursorInWindow" to true or false, depending on whether the local cursor actually lies within the VNC viewer window or not. For example, this can be determined by querying the cursor position via a call to the operating system and determining whether the cursor position is within the boundaries which define the VNC viewer window. The next step S504 is to wait for a "Cursor Moved" message from the local device operating system. As shown at step S506, a message has been received from the operating system that the "cursor moved to (X,Y) (local co-ordinates)" where (X,Y) specify the final location of the cursor. The system then checks to see whether the co-ordinates (X,Y) lie within the VNC Viewer window, i.e. within the remote desktop view, at step S508. If it does, the "CursorInWindow" flag is set to true and the system loops back to step S504 to wait for the next "Cursor Moved" message.

If the co-ordinates (X,Y) do not lie within the boundaries, the next step S512 is to check whether the "CursorInWindow" flag is currently set to true. If it is, we know that this latest cursor movement has just taken the cursor outside the remote desktop view, and that we need to synthesize a "Cursor Left Window" event. FIG. 5 shows one implementation which uses a simplistic approach to generate the coordinates for the "Cursor Left Window" event. At step S514, the local coordinates (X,Y) are clamped to the closest edge of the VNC viewer window by comparing the values X and Y with the x,y coordinate values for each boundary of the VNC viewer window and determining which edge is closest. The coordinates are then set to (X',Y') where one of X' or Y' represents the value of the closest boundary and the other coordinate represents the original value of the local coordinates. For example, if the left hand vertical boundary and the bottom horizontal boundary of the VNC viewer window have values of x=0 and y=0 respectively, for a position having coordinates of (2, 10), the left hand vertical boundary is clearly the closest and thus the new position is (0,10). The next step S516 is to synthesize a "Cursor Left Window" event using the new coordinates (X',Y'). The "CursorInWindow" flag is also cleared, i.e. set to false at step S518 and the system loops back to step S504 to wait for the next "Cursor Moved" message. The synthesis of the "Cursor Left Window" message is the equivalent of the "Cursor Left Window" message of FIG. 3a and the system then proceeds with the main algorithm described above.

As an alternative to Step S514, each time the "CursorInWindow" flag is set to true at Step S510, the system also stores the coordinates for the cursor. Accordingly, at step S512 if the system determines that the "CursorInWindow" flag is set to true, the new position (X',Y') can be determined from the last set of coordinates which have been stored (i.e. the last set of coordinates when the cursor was inside the VNC Viewer window) and the most recent set of coordinates which are outside the VNC Viewer window. The new coordinates are found by interpolating between these two coordinates and determining the intersection of the line joining these two coordinates with the edge of the VNC Viewer window.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A first computing device for controlling a second computing device, the first computing device comprising:
   a processor;
   a display for displaying data to a user;
   a user input in the form of a pointer which is moveable across said display for a user to input controls; and
   a data link for connecting said first computing device to said second computing device with image data from said second computing device being received at said first computing device over said data link and user controls being transmitted from said first computing device to said second computing device whereby said first computing device controls said second computing device;
   wherein said display displays image data from said second computing device within a window on said display, said window being smaller than said display;
   wherein said processor is configured to:
      determine that said pointer has left said window;
      responsive to determining said pointer has left said window, determine an intersection point on an edge of said window, said intersection point being a location at which the pointer left said window;
      determine whether or not said intersection point is within a threshold distance from a nearest corner of said window; and
      responsive to determining said intersection point is within said threshold distance, output a message to said second computing device that said pointer is positioned on said nearest corner.

2. The first computing device according to claim 1, wherein said first computing device comprises an operating system which tracks a location of the pointer on the display and said processor is configured to determine that said pointer has left said window by receiving a message from said operating system that said pointer has left said window.

3. The first computing device according to claim 2, wherein said processor is configured to determine said intersection point by receiving the location at which the pointer left said window from said operating system.

4. The first computing device according to claim 1, wherein said processor is configured to determine that said pointer has left said window by:
   receiving a location of said pointer on said display;
   determining whether or not said location is within said window;
   responsive to determining that said location is outside said window, determining whether said pointer was previously within said display; and
   responsive to determining that said pointer was previously within said display, determining that said pointer has left said window.

5. The first computing device according to claim 4, wherein responsive to determining that said location is within said window, said processor is configured to set a flag to indicate that said location is within said window and to wait for receipt of a next location of said pointer.

6. The first computing device according to claim 5, wherein determining whether said pointer was previously within said display comprises determining whether said flag is set.

7. The first computing device according to claim 4, wherein said processor is configured to determine said intersection point by determining which boundary of the window is the closest to the received location and setting one co-ordinate of the location to be the co-ordinate of the closest boundary.

8. The first computing device according to claim 4, wherein said processor is configured to determine said intersection point by interpolating between the received location which is outside the window and a previous location within the boundary.

9. The first computing device according to claim 4, wherein said first computing device comprises an operating system which tracks the location of the pointer on the display and which transmits the location of said pointer on said display to said processor.

10. The first computing device according to claim 9, wherein said operating system sends a message with the location of said pointer each time said pointer is moved.

11. The first computing device according to claim 1, wherein responsive to determining said intersection point is outside said threshold distance, the processor is configured to output a message to said second computing device that said pointer is positioned at said intersection point.

12. The first computing device according to claim 1, wherein said threshold distance is 30 pixels.

13. The first computing device according to claim 1, wherein said threshold distance is the smaller of 4% of the length or 4% of the width of the window.

14. The first computing device according to claim 1, wherein said threshold distance is ¼ inch.

15. The first computing device according to claim 1, wherein said processor is configured to receive user input to define said threshold distance.

16. A system comprising:
   a first computing device; and a second computing device coupled to said first computing device, said first computing device for controlling said second computing device;
wherein said first computing device comprises:
a processor;
a display for displaying data to a user;
a user input in the form of a pointer which is moveable across said display for a user to input controls; and
a data link for connecting said first computing device to said second computing device with image data from said second computing device being received at said first computing device over said data link and user controls being transmitted from said first computing device to said second computing device whereby said first computing device controls said second computing device;
wherein said display displays image data from said second computing device within a window on said display, said window being smaller than said display;
wherein said processor is configured to:
determine that said pointer has left said window;
responsive to determining said pointer has left said window, determine an intersection point on an edge of said window, said intersection point being a location at which the pointer left said window;
determine whether or not said intersection point is within a threshold distance from a nearest corner of said window; and
responsive to determining said intersection point is within said threshold distance, output a message to said second computing device that said pointer is positioned on said nearest corner; and
wherein said second computing device is configured to launch a user interface when said second computing device receives said message that said pointer is positioned on said nearest corner.

17. A method of using a first computing device to control a second computing device, the method comprising:
displaying image data from said second computing device within a window on a display of said first computing device, said window being smaller than said display;
determining that a pointer which is moveable across said display has left said window;
responsive to determining said pointer has left said window, determining an intersection point on an edge of said window, said intersection point being a location at which the pointer left said window;
determining whether or not said intersection point is within a threshold distance from a nearest corner of said window; and
responsive to determining said intersection point is within said threshold distance, outputting a message to said second computing device that said pointer is positioned on said nearest corner.

18. A non-transitory carrier carrying processor control code, which when running on a processor, causes said processor to perform a method of using a first computing device to control a second computing device, the method comprising:
displaying image data from said second computing device within a window on a display of said first computing device, said window being smaller than said display;
determining that a pointer which is moveable across said display has left said window;
responsive to determining said pointer has left said window, determining an intersection point on an edge of said window, said intersection point being a location at which the pointer left said window;
determining whether or not said intersection point is within a threshold distance from a nearest corner of said window; and
responsive to determining said intersection point is within said threshold distance, outputting a message to said second computing device that said pointer is positioned on said nearest corner.

\* \* \* \* \*